(12) United States Patent
Miyake

(10) Patent No.: US 11,520,253 B2
(45) Date of Patent: Dec. 6, 2022

(54) IMAGING SYSTEM

(71) Applicant: HEWLETT-PACKARD DEVELOPMENT COMPANY, L.P., Spring, TX (US)

(72) Inventor: Koji Miyake, Yokohama (JP)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 30 days.

(21) Appl. No.: 17/051,754

(22) PCT Filed: Jun. 5, 2019

(86) PCT No.: PCT/US2019/035538
§ 371 (c)(1),
(2) Date: Oct. 29, 2020

(87) PCT Pub. No.: WO2020/018184
PCT Pub. Date: Jan. 23, 2020

(65) Prior Publication Data
US 2021/0240110 A1      Aug. 5, 2021

(30) Foreign Application Priority Data

Jul. 20, 2018   (JP) .............................. JP2018-136617

(51) Int. Cl.
| G03G 15/00 | (2006.01) |
| G03G 15/16 | (2006.01) |
| B65G 39/16 | (2006.01) |
| B65H 5/02 | (2006.01) |

(52) U.S. Cl.
CPC ......... *G03G 15/1615* (2013.01); *B65G 39/16* (2013.01); *B65H 5/021* (2013.01); *B65H 2404/255* (2013.01); *B65H 2404/2561* (2013.01); *B65H 2511/214* (2013.01); *B65H 2511/52* (2013.01)

(58) Field of Classification Search
CPC .. G03G 15/143; G03G 15/156; G03G 15/161; G03G 15/1605; G03G 15/1615; G03G 15/50; G03G 15/5054; G03G 15/6529; G03G 15/6567; G03G 2215/139; G03G 2215/151; B65G 15/64; B65G 39/16
USPC ................................ 399/162, 165, 302, 308
See application file for complete search history.

(56) References Cited

U.S. PATENT DOCUMENTS 9,442,410 B2    9/2016   Makishima

FOREIGN PATENT DOCUMENTS

| JP | 2009-139952 | * | 6/2009 |
| JP | 201263427 | | 3/2012 |
| JP | 201466841 | | 4/2014 |
| JP | 2014-106282 A | | 6/2014 |
| JP | 201416282 | | 6/2014 |
| JP | 2016-009161 | * | 1/2016 |

(Continued)

*Primary Examiner* — Hoan H Tran
(74) *Attorney, Agent, or Firm* — Staas & Halsey LLP

(57) ABSTRACT

An imaging system includes: a steering roller located between a first belt roller and a second belt roller, that is inclinable around a fulcrum; and a sensor to detect an amount of displacement of the steering roller due to an inclination of the steering roller. A controller may output a command signal when the amount of displacement of the steering roller exceeds a reference value.

15 Claims, 15 Drawing Sheets

(56) References Cited

FOREIGN PATENT DOCUMENTS

| JP | 201749383 | 3/2017 |
|---|---|---|
| JP | 2017203805 | 11/2017 |
| JP | 2017203901 | 11/2017 |
| JP | 201897355 | 6/2018 |

* cited by examiner

Fig.5
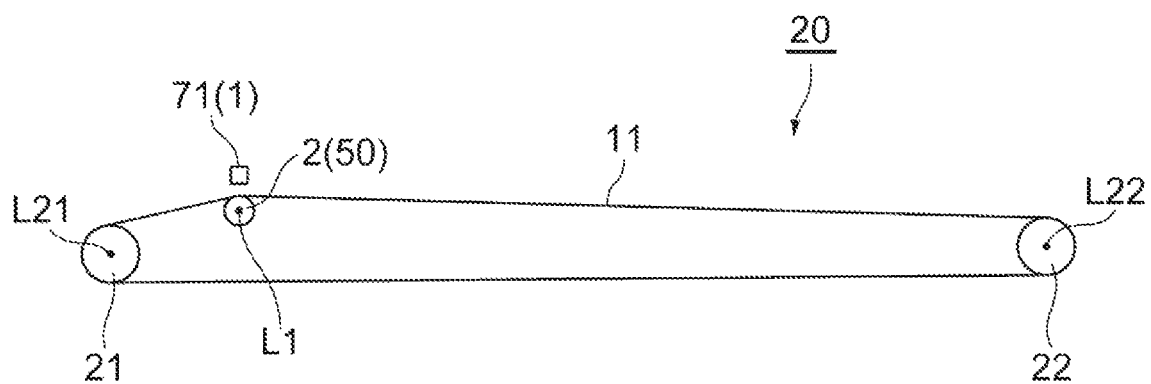
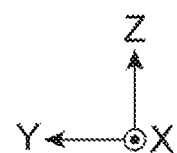

IMAGING SYSTEM

BACKGROUND

An imaging system includes a belt driving device. The belt driving device includes a first belt roller and a second belt roller around which an endless belt is wound.

BRIEF DESCRIPTION OF DRAWINGS

FIG. 5 is a side view of components of an example belt driving device in an imaging system.

DETAILED DESCRIPTION

In the following description, with reference to the drawings, the same reference numbers are assigned to the same components or to similar components having the same function, and overlapping description is omitted. An imaging system may include an image forming apparatus such as a printer or the like. The imaging system may include a portion of the image forming apparatus, for example, a belt abnormality detection device, a belt driving device, a belt adjustment mechanism, and/or a transfer belt system.

Figure 1:
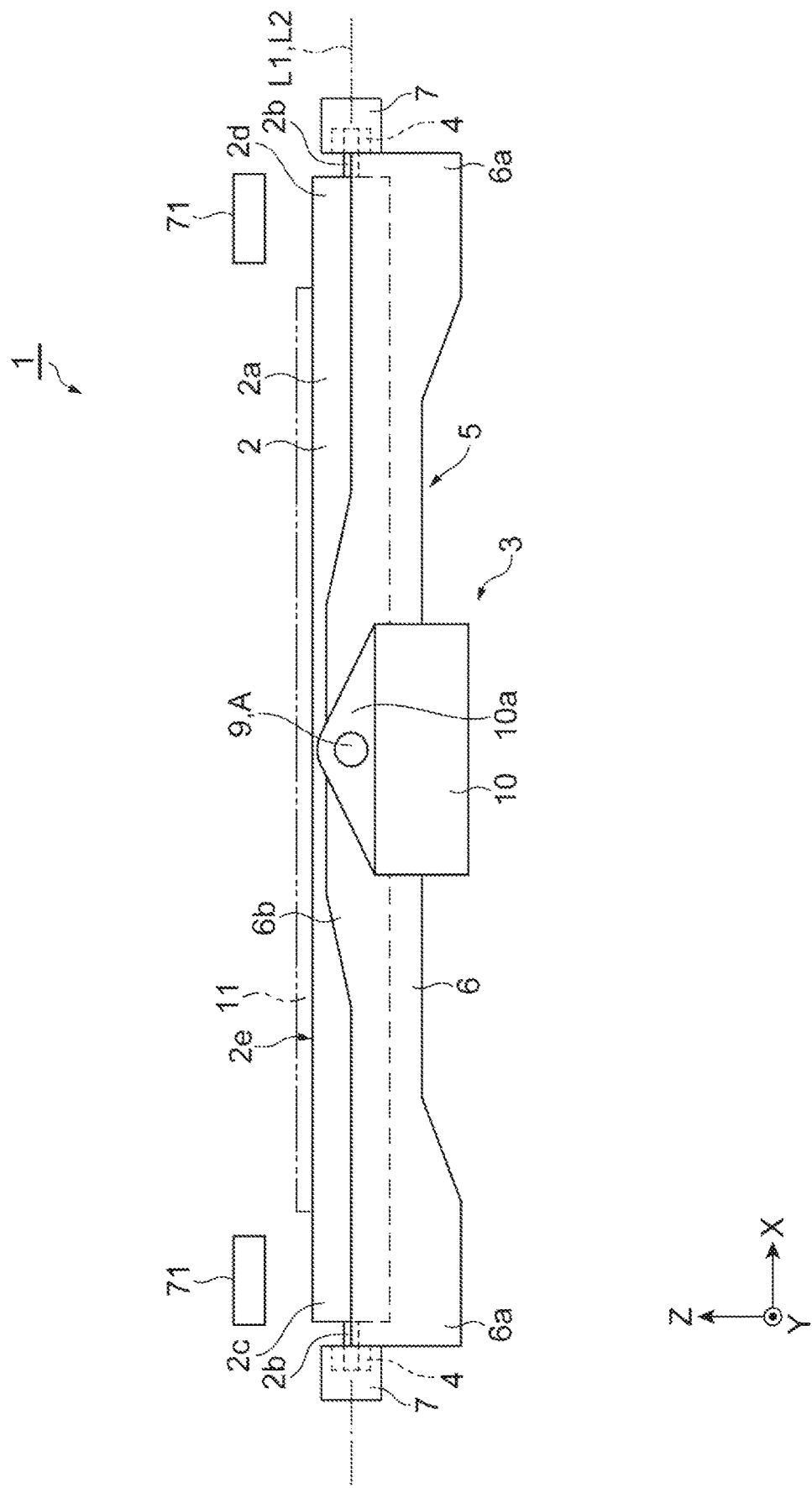
FIG. 1 is a front view of an example belt abnormality detection device for an imaging system.

FIG. 1 shows an example belt abnormality detection device 1 including a steering roller 2 that is inclinable by rotating around a fulcrum A, and a sensor 71. In FIG. 1, three directions which intersect each other are illustrated by arrows. An X direction is a direction along a longitudinal direction L2 of the steering roller 2. A Z direction is an upper and lower direction. A Y direction is a direction that intersects the X direction and the Y direction.

The steering roller 2 includes a roller main body 2a and a pair of small-diameter portions 2b. In the longitudinal direction L2 of the steering roller 2, the small-diameter portions 2b extend from the roller main body 2a to an external side. For example, the roller main body 2a and the small-diameter portions 2b may have a columnar shape. An outer diameter of each of the small-diameter portion 2b may be smaller than an outer diameter of the roller main body 2a. The roller main body 2a and the small-diameter portion 2b are arranged coaxially.

The steering roller 2 is supported by a pair of bearings 4 to rotate around an axial line L1. The axial line L1 is a virtual straight line that extends along the longitudinal direction L2 of the steering roller 2. The bearings 4 rotatably support both ends of the steering roller 2 in the longitudinal direction L2. For example, the bearings 4 may be cylindrical sleeves. The bearings 4 may be other bearings. Each of the bearings 4 includes a plane that may contact an outer peripheral surface of the small-diameter portion 2b.

The belt abnormality detection device 1 can include a steering roller holding member 5 that holds the steering roller 2. The steering roller holding member 5 includes a steering roller holding member main body 6 and a pair of bearing holding members 7. The steering roller holding member 5 can include a bearing supporting member. The steering roller holding member main body 6 extends along the longitudinal direction L2 of the steering roller 2. For example, each of the bearing holding members 7 may include a cylindrical bearing accommodation portion. The bearing 4 is held by the bearing holding member 7. Each of the pair of bearing holding members 7 is attached to each of both ends 6a of the steering roller holding member main body 6. The end 6a is an end in the longitudinal direction L2 of the steering roller 2.

The steering roller holding member main body 6 may include a pair of side plates 6b which are disposed to face each other in the Y direction. For example, a plate thickness direction of the side plates 6b may correspond to a direction along the Y direction. The pair of side plates 6b is disposed on an outer side of the steering roller 2 in the Y direction. For example, the steering roller 2 may be disposed between the pair of side plates 6b. A pivot shaft 9 is provided in the side plates 6b.

Figure 2:
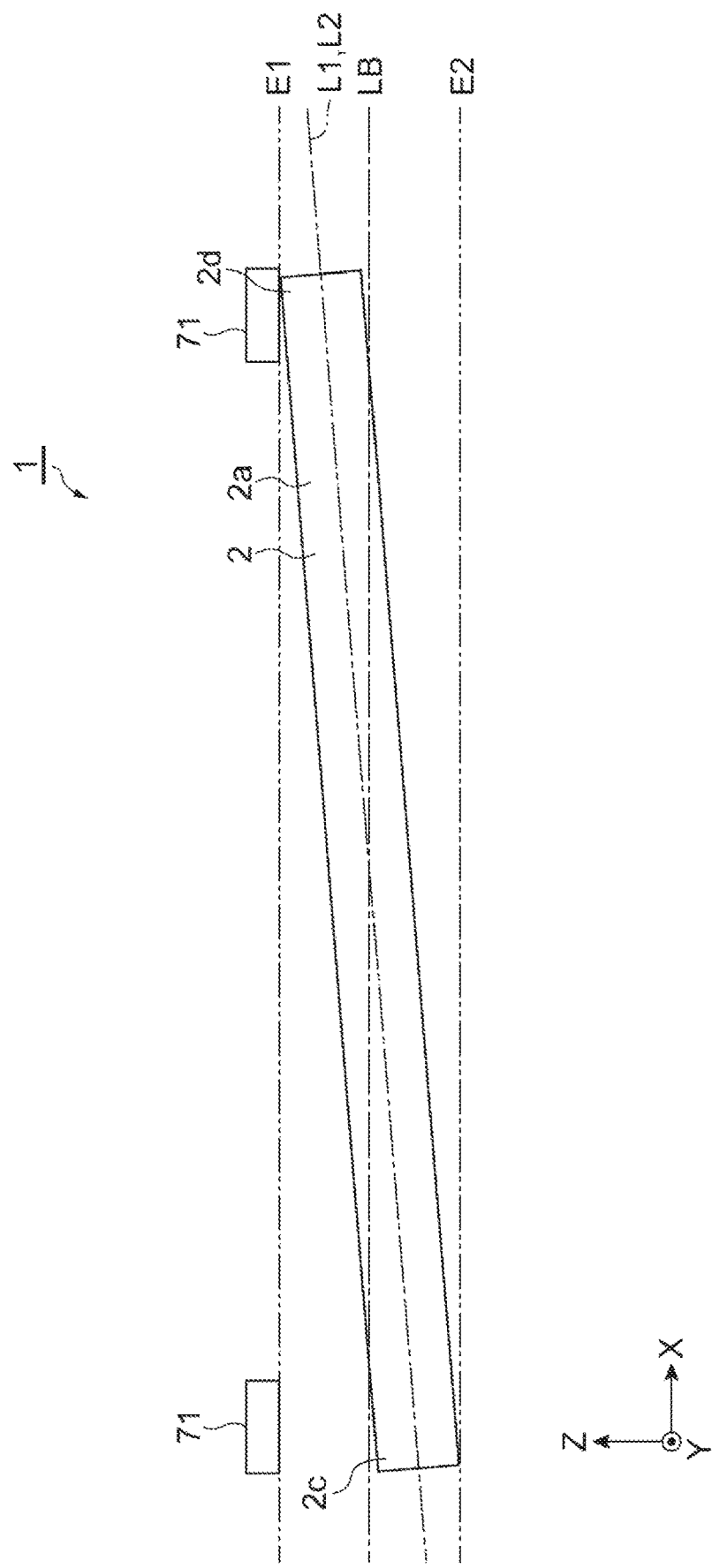
FIG. 2 is a front view illustrating components of an example belt abnormality detection device including a contact-type sensor.

The pivot shaft 9 may have a columnar shape, and constitutes the fulcrum A. The pivot shaft 9 extends in the Y direction. The pivot shaft 9 is rotatably supported by a pivot shaft holding member 10. The pivot shaft holding member 10 may include a pair of side portions 10a which are disposed to face each other in the Y direction. The pair of side portions 10a is disposed on an outer side of the steering roller holding member main body 6 in the Y direction. For example, the steering roller holding member main body 6 may be located between the pair of side portions 10a. The side portions 10a are disposed to face the side plates 6b in the Y direction. A bearing portion that rotatably supports the pivot shaft 9 is formed in the side portions 10a. For example, the bearing portion may be a through-hole. The steering roller 2 can swing with the pivot shaft 9 set as the fulcrum A. As illustrated in FIG. 2, the steering roller 2 can be inclined.

The sensor 71 is a sensor that can detect the amount of displacement of the steering roller 2 due to an inclination. The sensor 71 may detect the amount of displacement of a first end 2c of the roller main body 2a of the steering roller 2. The sensor 71 may detect the amount of displacement of a second end 2d of the roller main body 2a. For example, the sensor 71 may be a contact-type sensor which may include a piezoelectric element that detects a contact with the steering roller 2. In some examples, the sensor 71 may be disposed on an upward side of the first end $2c$ in the Z direction (e.g. the sensor 71 may be located above the first end $2c$) to detect the amount of displacement of the first end $2c$ of the roller main body $2a$ of the steering roller 2. In some examples, the sensor 71 may be disposed on an upward side of the second end $2d$ in the Z direction (e.g. the sensor 71 may be located above the second end $2d$) to detect the amount of displacement of the second end $2d$. In some examples, as illustrated in FIG. 1, belt abnormality detection device 1 may include two sensors 71, located above the first end $2c$ and the second $2d$ of the steering roller 2.

In a state illustrated in FIG. 1, the steering roller 2 is in a non-inclination state. At this time, the first end $2c$ and the second end $2d$ of the steering roller 2 are set to the same position in the Z direction. FIG. 2 illustrates a state in which the steering roller 2 is inclined. In FIG. 2, an axial line when the steering roller 2 is not inclined is set as a reference line LB. In FIG. 2, a movable range of the steering roller 2 in a normal state is illustrated with virtual lines E1 and E2. When the steering roller 2 inclined in a state of exceeding the virtual lines E1 and E2, for example, it enters an abnormal state. In the abnormal state, for example, there is a possibility that the endless belt 11 that comes into contact with the steering roller 2 may be broken. The virtual lines E1 and E2 may be set to other positions.

The sensor 71 can detect that the first end $2c$ of the steering roller 2 reaches a position on the virtual line E1. The sensor 71 can detect that the second end $2d$ of the steering roller 2 reaches the virtual line E1. Accordingly, it is possible to detect that the amount of displacement of the steering roller 2 due to the inclination exceeds a determination threshold value (reference value). When the steering roller 2 does not contact the sensor 71, an inclination of the steering roller 2 is within a normal range.

Figure 3:
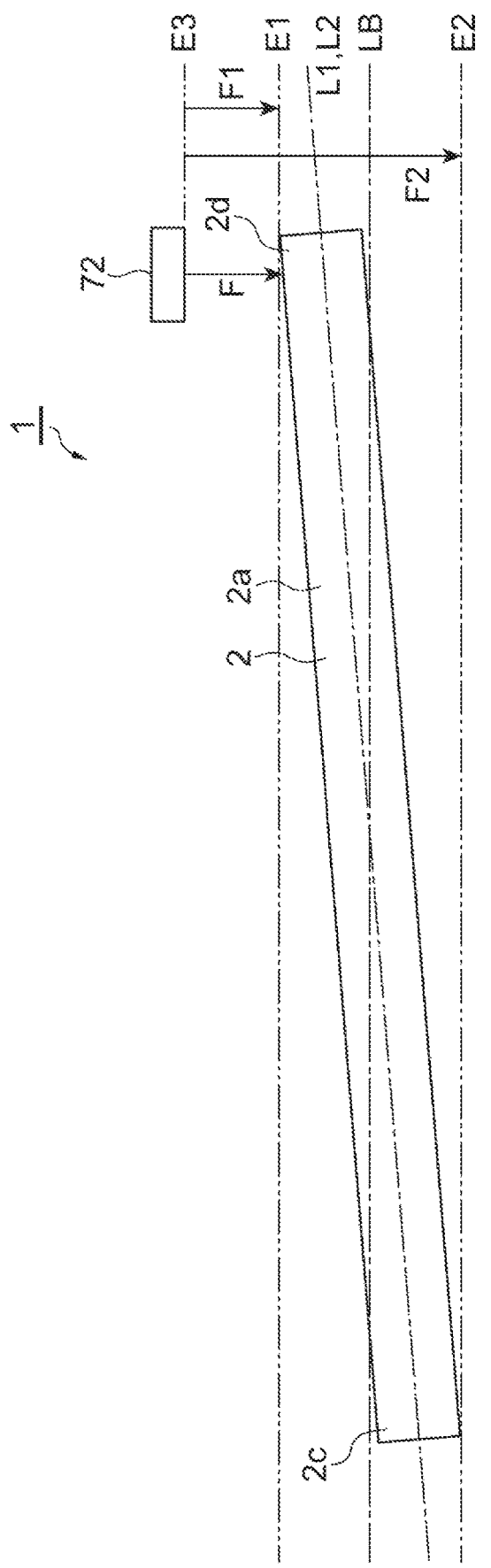
FIG. 3 is a front view illustrating components of an example belt abnormality detection device including a distance sensor.

With reference to FIG. 3, the belt abnormality detection device 1 may include a sensor 72 that can detect the amount of displacement of the steering roller 2 due to the inclination. The sensor 72 can measure a distance F from a position E3 of the sensor 72 to the second end $2d$ of the steering roller 2. For example, the sensor 72 can measure a distance F by irradiating the second end $2d$ with laser light and by detecting the laser light reflected from the second end $2d$. The sensor 72 may include a semiconductor laser and a light-receiving element.

For example, a distance from the position E3 to the virtual line E1, in the Z direction, may be set as a distance F1, and a distance from the position E3 to the virtual line E2 may be set as a distance F2. When the distance F is shorter than the distance F1, the second end $2d$ reaches the virtual line E1. When the distance F is longer than the distance F2, the second end $2d$ reaches the virtual line E2. In other words, when the distance F is longer than the distance F2, the first end $2c$ reaches the virtual line E1. Accordingly, it is possible to detect that the amount of displacement of the steering roller 2 due to the inclination exceeds the determination threshold value (reference value). When the distance F is longer than the distance F1 and is shorter than a distance F2, then the inclination of the steering roller 2 is in a normal range. The sensor 72 can detect the amount of displacement of the steering roller 2 due to the inclination by detecting a distance to other positions of the steering roller 2.

Figure 4:
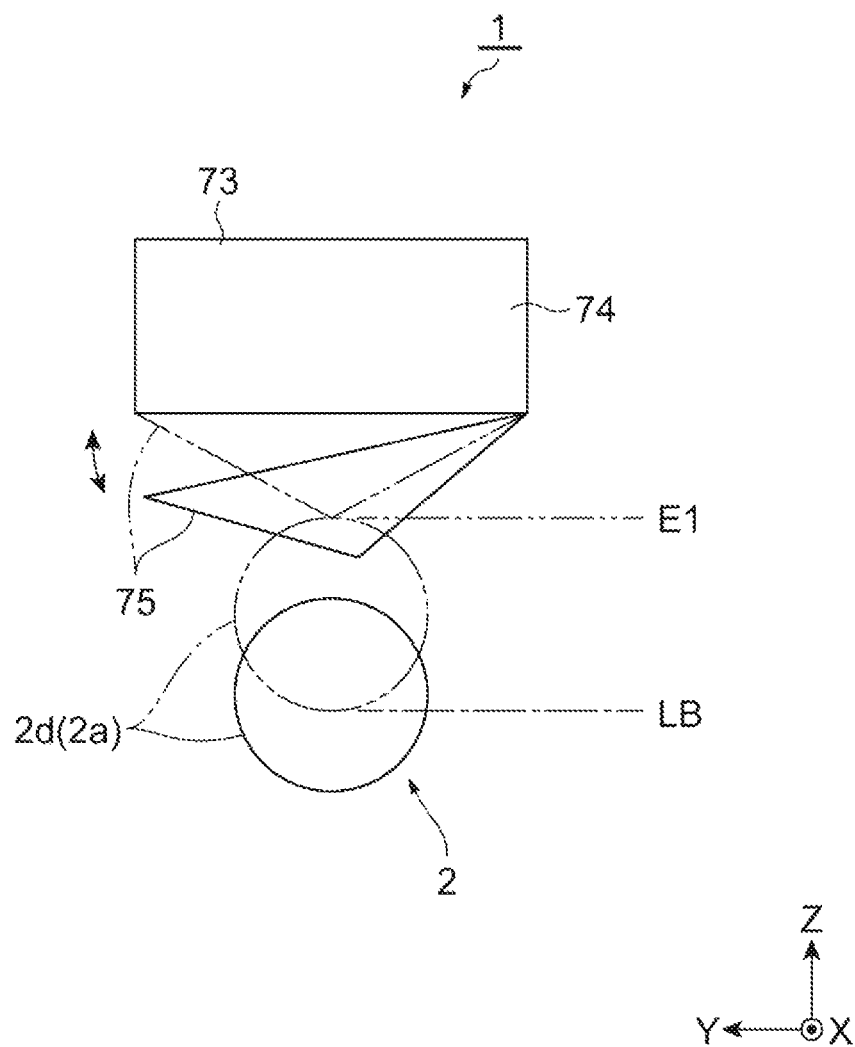
FIG. 4 is a side view illustrating components an example belt abnormality detection device including a light-shielding type sensor.

With reference to FIG. 4, the belt abnormality detection device 1 may include a sensor 73 that can detect the amount of displacement of the steering roller 2 due to the inclination. For example, the sensor 73 may be a light-shielding type sensor. The sensor 73 may include a light-receiving element that can detect light. The sensor 73 may include a sensor main body 74 and a light-shielding piece 75. For example, the sensor main body 74 can include a housing that accommodates a light-receiving element. The light-shielding piece 75 is pivotally attached to the sensor main body 74 (e.g. in a swingable manner). For example, the light-shielding piece 75 is supported to the sensor main body 74 by a hinge. When a gap occurs between the light-shielding piece 75 and the sensor main body 74, the light-receiving element can detect light. When a gap does not occur between the light-shielding piece 75 and the sensor main body 74, the light-shielding piece 75 can block incident light to the light-receiving element.

In some examples, the sensor 73 may be disposed on an upward side of the second end $2d$ of the steering roller 2 (e.g. the sensor 73 may be located above the second end $2d$). When the second end $2d$ of the steering roller 2 reaches the virtual line E1, the light-shielding piece 75 contacts the steering roller 2. The light-shielding piece 75 is displaced upward and can block incidence of light to the light-receiving element. In some examples, the sensor 73 may be disposed on an upward side of the first end $2c$ of the steering roller 2 (e.g. the sensor 73 may be located above the first end $2c$). When the first end $2c$ of the steering roller 2 reaches the virtual line E1, the light-shielding piece 75 contacts the steering roller 2. The light-shielding piece 75 is displaced upward and can block incidence of light to the light-receiving element. When the inclination of the steering roller 2 is within a normal range, light is incident to the sensor main body 74 through a gap between the light-shielding piece 75 and the sensor main body 74, and light can be detected by the light-receiving element.

Figure 6:
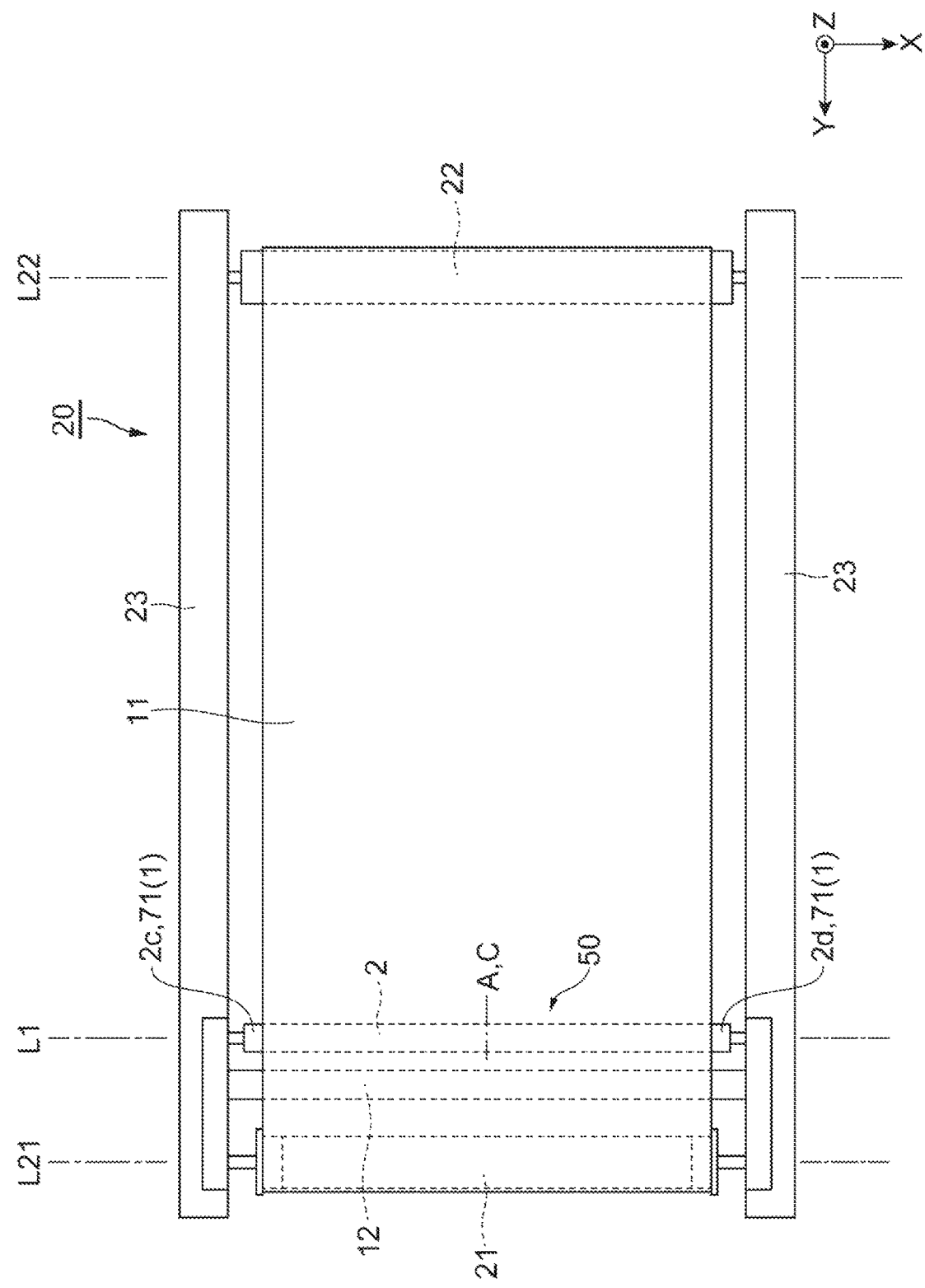
FIG. 6 is a plan view of an example belt driving device.

An example belt driving device 20 illustrated in FIG. 5 and FIG. 6 includes a first belt roller 21, a second belt roller 22, the steering roller 2, and an endless belt 11. The belt driving device 20 includes the belt abnormality detection device 1. The first belt roller 21 extends in a first direction which may be defined by the X direction. The first belt roller 21 can rotate around an axial line L21 that extends in the X direction. For example, the first belt roller 21 has a columnar shape. The first belt roller 21 may be a driving roller. The first belt roller 21 rotates when power is transmitted from an electric motor (not illustrated).

Figure 15:
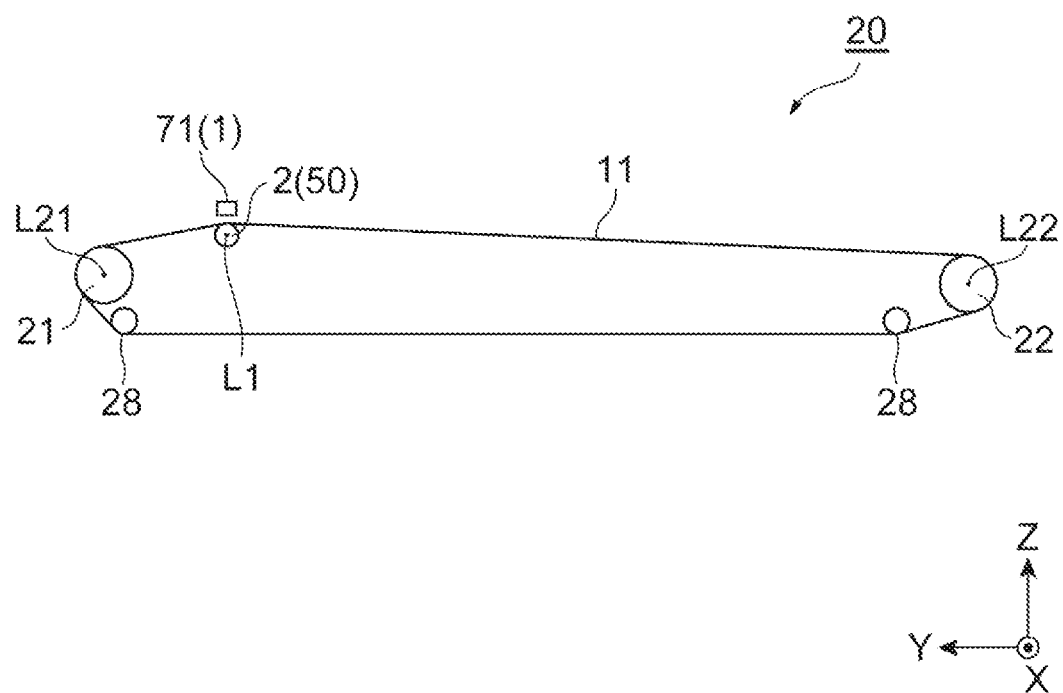
FIG. 15 is a side view illustrating components of an example belt driving device.

The second belt roller 22 extends in the X direction. The second belt roller 22 is disposed to be spaced away from the first belt roller 21 in a second direction. The second direction is a direction that intersects the first direction, and may be defined by the Y direction. The second belt roller 22 can rotate around an axial line L22 that extends in the X direction. For example, the second belt roller 22 has a columnar shape. The second belt roller 22 may be a stretching roller. The second belt roller 22 may be a driven roller that rotates in accordance with movement of the endless belt 11. The belt driving device 20 may include a plurality of idle rollers 28 which are disposed between the first belt roller 21 and the second belt roller 22 in the Y direction (refer to FIG. 15). The idle rollers 28 may be stretching rollers. The idle roller 28 can rotate around an axial line that extends in the X direction. For example, the idle rollers 28 may be in contact with the endless belt 11 on a lower side. The idle rollers 28 can rotate in accordance with movement of the endless belt 11.

The steering roller 2 is disposed between the first belt roller 21 and the second belt roller 22 in the Y direction. In some examples, the steering roller 2 may be disposed at a position that is closer to the first belt roller 21 in comparison to the center in the Y direction. In some examples, the steering roller 2 may be disposed at a position that is closer to the second belt roller 22 in comparison to the center in the Y direction. In the Z direction, the axial line L1 of the steering roller 2 is disposed at a position that is higher relative to a position of the axial line L21 of the first belt roller 21. The steering roller 2 may be arranged to be in contact with the endless belt 11 disposed on a lower side.

As illustrated in FIG. 6, the belt driving device 20 includes a pair of frames 23. The frames 23 extend in the Y direction. The pair of frames 23 are spaced apart from each other in the X direction. The pair of frames 23 rotatably supports the first belt roller 21 and the second belt roller 22.

Figure 7:
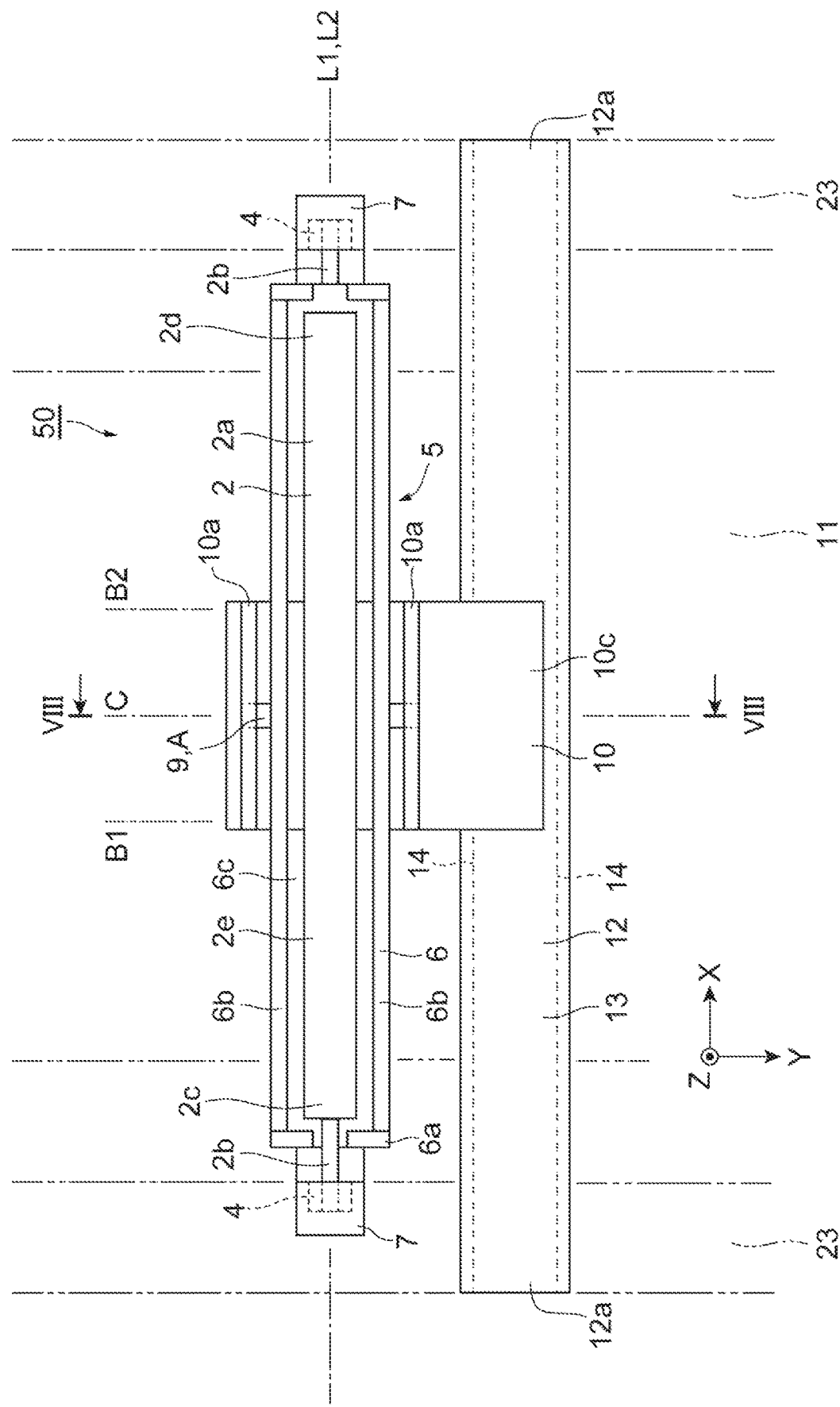
FIG. 7 is a plan view illustrating an example belt position adjustment mechanism.
Figure 8:
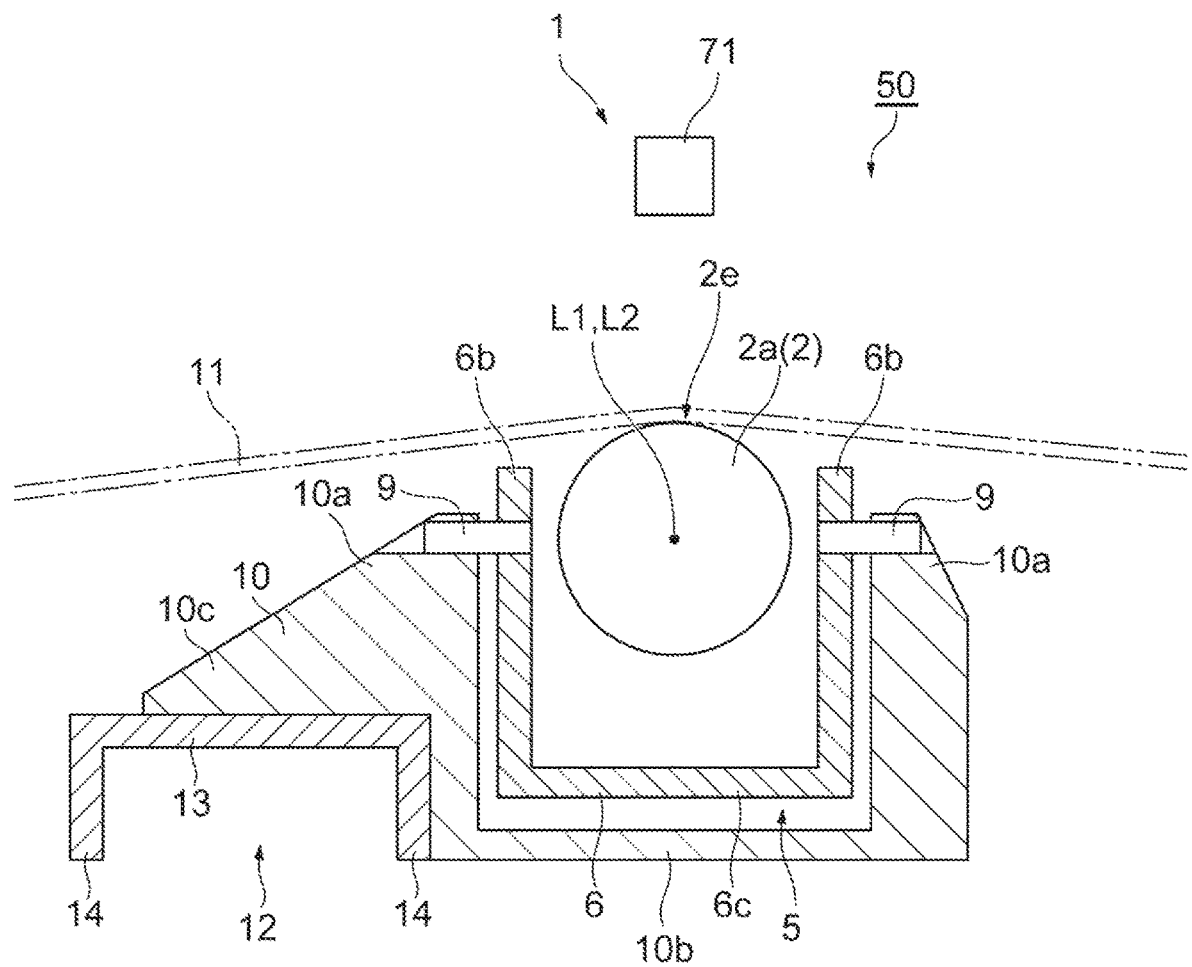
FIG. 8 is a cross-sectional view illustrating of the example belt position adjustment mechanism taken along line VIII-VIII.

With reference to FIGS. 7 and 8, the belt driving device 20 may include a belt position adjustment mechanism 50. FIG. 7 shows a plan view illustrating an example of the belt position adjustment mechanism 50. FIG. 8 is a cross-sectional view illustrating the example belt position adjustment mechanism 50, taken along line VIII-VIII in FIG. 7. The belt position adjustment mechanism 50 includes the steering roller 2 and can change a position of the endless belt 11 in the X direction. The belt position adjustment mechanism 50 can include the steering roller holding member main body 6. The steering roller holding member main body 6 may include a bottom plate 6c. The bottom plate 6c extends in the longitudinal direction L2 of the steering roller 2 and connects the pair of side plates 6b to each other. A plate thickness direction of the bottom plate 6c conforms to the Z direction. The steering roller 2 is disposed in a space that is surrounded by the pair of side plates 6b and the bottom plate 6c. In a peripheral direction of the steering roller 2, a part of an outer peripheral surface 2e is exposed to the outside of the holding member main body 6. In the outer peripheral surface 2e, a portion on an upward side of the side plates 6b is exposed to the outside, and can come into contact with the endless belt 11.

The pivot shaft holding member 10 may include a bottom portion 10b as illustrated in FIG. 8. The bottom portion 10b may be divided in the Y direction. The bottom portion 10b overhangs from a lower side of the side portions 10a in the Y direction. The bottom portion 10b is disposed to face the bottom plate 6c in the Z direction. The bottom plate 6c is disposed on a side opposite to the steering roller 2 with the bottom plate 6c set as a reference.

The pivot shaft holding member 10 may include an overhanging portion 10c that overhangs from one side portion 10a. For example, the overhanging portion 10c overhangs toward the first belt roller 21 in the Y direction.

Figure 9:
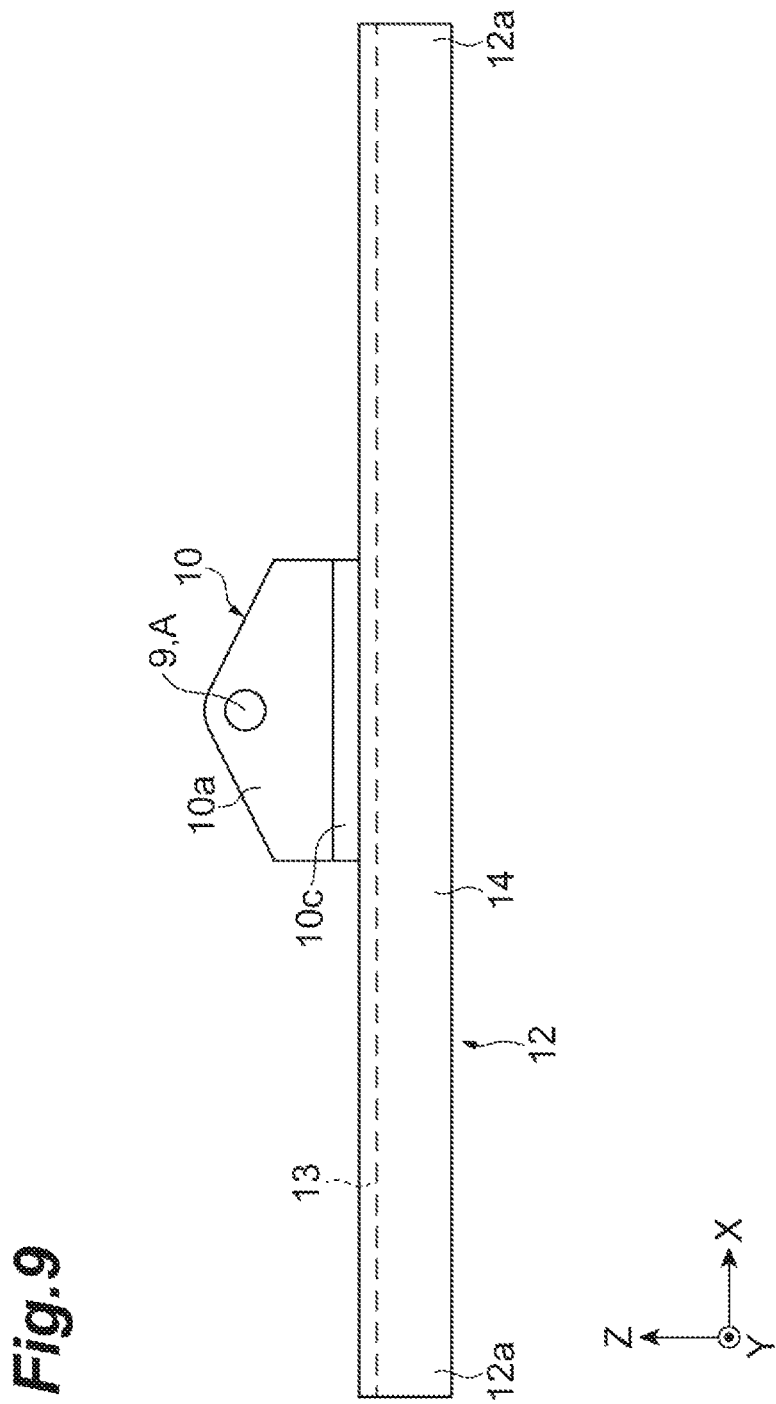
FIG. 9 is a side view illustrating components of an example belt position adjustment mechanism.

With reference to FIG. 7 to FIG. 9, the belt position adjustment mechanism 50 may include a connection member 12. The connection member 12 extends in the X direction. For example, the connection member 12 may be disposed between the first belt roller 21 and the steering roller 2 in the Y direction. The connection member 12 may include a plate portion 13 and a pair of side plates 14. A plate thickness direction of the plate portion 13 conforms to the Z direction. The pair of side plates 14 are disposed to be spaced apart from each other in the Y direction. A plate thickness direction of the side plates 14 conforms to the Y direction. The pair of side plates 14 overhangs downward from the plate portion 13. The overhanging portion 10c of the pivot shaft holding member 10 is attached to an upper surface of the plate portion 13. A lower end of each of the side portions 10a of the pivot shaft holding member 10 may be in contact with the side plates 14 in the Y direction. The pivot shaft holding member 10 is fixed to the connection member 12 and can move integrally with the connection member 12. An end 12a of the connection member 12 in a longitudinal direction may be supported, for example, by the frames 23.

Figure 10:
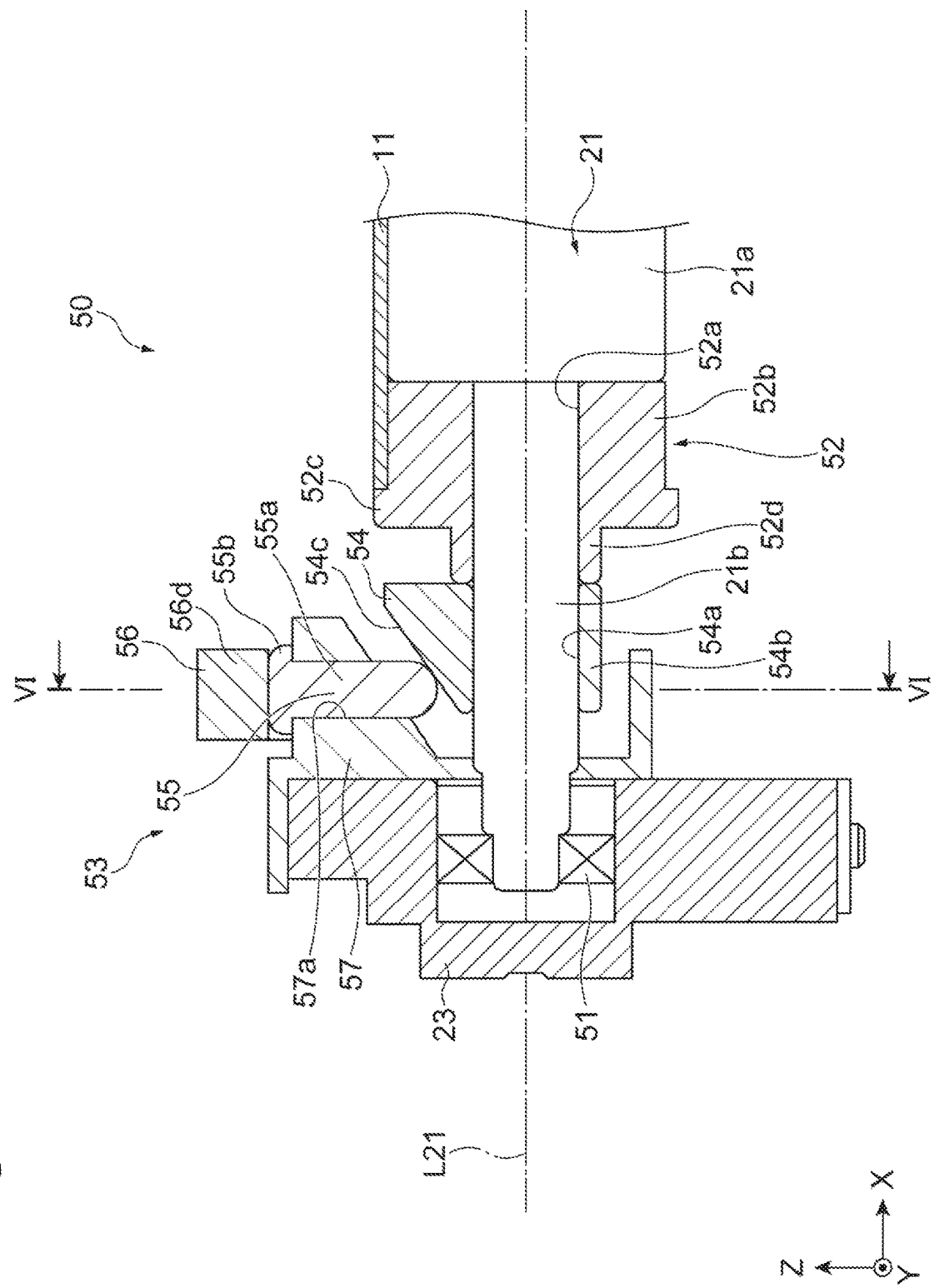
FIG. 10 is a cross-sectional view illustrating components of an example belt position adjustment mechanism.

With reference to FIG. 10, an end structure of the first belt roller 21 will be described. The first belt roller 21 may include a first belt roller main body 21a and a small-diameter portion 21b. The small-diameter portion 21b overhangs from an end of the first belt roller main body 21a to an outer side in the X-direction. A length of the endless belt 11 in the X direction is longer than a length of the first belt roller main body 21a in the X direction. In the X direction, the endless belt 11 further overhangs to an outer side relative to the first belt roller main body 21a. The belt driving device 20 may include a bearing 51 that rotatably supports the first belt roller 21. For example, the bearing 51 may be a cylindrical sleeve, or may have other structures. The belt position adjustment mechanism 50 may include a wheel (or pulley) 52 and a link mechanism 53. For example, the wheel 52 may be attached to the first belt roller 21. The wheel 52 can move in the X direction in accordance with movement of the endless belt 11 in the X direction.

A central opening 52a is formed in the wheel 52. The small-diameter portion 21b can be inserted into the central opening 52a. The wheel 52 includes a main body portion 52b, a flange portion 52c, and a small-diameter portion 52d. For example, the main body portion 52b may have a columnar shape. The central opening 52a is formed at the center of the main body portion 52b. An outer diameter of the main body portion 52b is approximately the same as an outer diameter of the first belt roller main body 21a. An outer peripheral surface of the main body portion 52b can come into contact with the endless belt 11.

The flange portion 52c further overhangs to an outer side relative to the outer peripheral surface of the main body portion 52b in a radial direction. The flange portion 52c is formed over the entire periphery in a peripheral direction of the wheel 52. The flange portion 52c is disposed on a side opposite to the first belt roller main body 21a in the X direction. The flange portion 52c may further overhang to an outer side relative to an outer surface of the endless belt 11 in a radial direction. The outer surface of the endless belt 11 is a surface opposite to the first belt roller 21. An inner surface of the endless belt 11 is surface on the first belt roller 21 side and can come into contact with the first belt roller 21. An end surface of the endless belt 11 is an end surface on an outer side in the X direction.

The flange portion 52c includes a surface that can come into contact with the end surface of the endless belt 11 in the X direction. For example, when a position of the endless belt 11 deviates to an outer side in the X direction, the end surface of the endless belt 11 comes into contact with the flange portion 52c. The wheel 52 receives the positional deviation of the endless belt 11, and can slide in the X direction.

The small-diameter portion 52d of the wheel 52 further overhangs to an outer side relative to the flange portion 52c in the Z direction. The small-diameter portion 52d includes a cylindrical portion having a diameter smaller than that of the main body portion 52b. The central opening 52a is formed at the center of the small-diameter portion 52d.

The link mechanism 53 may include a first intermediate member 54, a pin member 55, and a second intermediate member 56. The first intermediate member 54 is mounted on the first belt roller 21. The first intermediate member 54 is disposed between the wheel 52 and the bearing 51 in the X direction. When the wheel 52 moves outward in the X direction, the first intermediate member 54 is pressed by the wheel 52 and moves outward in the X direction. An opening 54a is provided to pass through the first intermediate member 54 in the X direction. The small-diameter portion 21b of the first belt roller 21 is inserted into the opening 54a.

The first intermediate member 54 includes a main body portion 54b in which the opening 54a is formed. The main body portion 54b has an outer surface that includes an inclined surface 54c. For example, the inclined surface 54c is a surface on an upper side of the main body portion 54b. The inclined surface 54c is inclined to be gradually spaced away from the axial line L21 from an outer side to an inner side in the X direction. In other words, the inclined surface 54c is inclined to higher (or thicker) toward the inner side than toward the outer side in the X direction. Accordingly, when the first intermediate member 54 moves to the outer side in the X direction, the first intermediate member 54 pushes up (or lifts) a member that contacts (or engages with) the inclined surface 54c.

Figure 11:
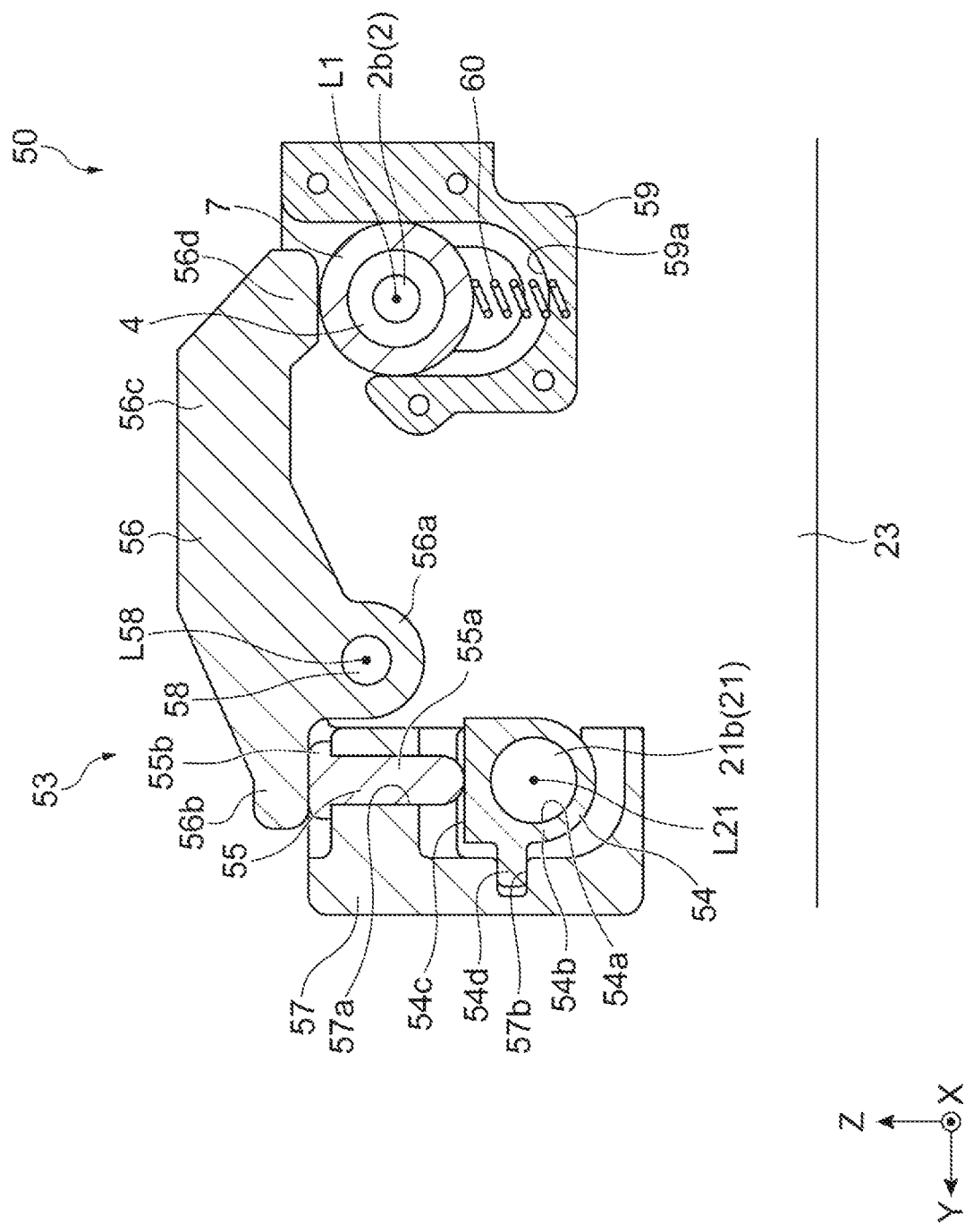
FIG. 11 is a cross-sectional view of the components shown in FIG. 10, taken along line VI-VI.

As illustrated in FIG. 11, an overhang piece (or protrusion) 54d that overhang outward is formed at a side portion of the main body portion 54b. For example, the overhang piece 54d is continuous in the X direction in a plate shape. The overhang piece 54d is continuous in a direction in which the opening 54a passes. A plate thickness direction of the overhang piece 54d conforms to the Z direction.

The pin member 55 may include a main body portion 55a and a flange portion 55b. The main body portion 55a has a columnar shape. The flange portion 55b overhangs from the main body portion 55a to an outer side in a radial direction. The main body portion 55a is disposed in the X direction. The flange portion 55b is formed on an upper end of the main body portion 55a. For example, a lower end of the main body portion 55a may include a spherical surface.

The link mechanism 53 may include a holding member 57. The holding member 57 is attached to the frames 23. The holding member 57 includes a pin member supporting portion 57a and a first intermediate member guide portion 57b. An opening, which passes through the pin member supporting portion 57a in the Z direction, is formed in the pin member supporting portion 57a. The pin member 55 is inserted into the opening. A surface that can come into contact with the flange portion 55b of the pin member 55 is formed on an edge portion of the opening. When the flange portion 55b comes into contact with the edge portion of the opening, a position of the pin member 55 in the Z direction is restricted. For example, a downward movement of the pin member 55 is restricted.

The first intermediate member guide portion 57b includes a guide groove that guides movement of the overhang piece 54d of the first intermediate member 54. The first intermediate member guide portion 57b is disposed to face the first intermediate member 54 in the Y direction. A guide groove is provided in a surface of the first intermediate member guide portion 57b which faces the first intermediate member 54. The guide groove is continuous in the X direction. The overhang piece 54d of the first intermediate member 54 is inserted into the guide groove. The overhang piece 54d moves along the guide groove, and movement of the first intermediate member 54 in the X direction is guided.

The second intermediate member 56 may include a fulcrum portion 56a, a receiving portion 56b, a continuous portion 56c, and a pressing portion 56d. The second intermediate member 56 can swing around the fulcrum portion 56a that is a pivot portion. An opening is formed in the fulcrum portion 56a. A supporting shaft 58 is inserted into the opening. For example, the supporting shaft 58 is attached to the frames 23. The supporting shaft 58 extends in the X direction. The supporting shaft 58 extends from the frames 23 to an inner side in the X direction. The supporting shaft 58 is disposed between the first belt roller 21 and the steering roller 2 in the Y direction. The fulcrum portion 56a can rotate around the supporting shaft 58. For example, an axial line L58 of the supporting shaft 58 may be disposed on an upward side (e.g. above) relative to the axial lines L21 and L1 in the Z direction.

The receiving portion 56b is connected to the fulcrum portion 56a and overhangs outward in the Y direction. The receiving portion 56b extends to the first belt roller 21 side in the Y direction. The receiving portion 56b is disposed on an upward side relative to the fulcrum portion 56a. The receiving portion 56b extends to a position capable of contacting an upper end of the pin member 55. The receiving portion 56b can come into contact with the upper end of the pin member 55. The receiving portion 56b is displaced in accordance with movement of the pin member 55 in the Z direction. When the pin member 55 moves upward, the receiving portion 56b moves upward in conjunction with the receiving portion 56b.

The continuous portion 56c is connected to the fulcrum portion 56a and extends inward in the Y direction. The continuous portion 56c extends to a side opposite to the receiving portion 56b in the Y direction. The continuous portion 56c is disposed on an upward side relative to the fulcrum portion 56a. The continuous portion 56c extends to an upward side of a bearing holding member 7. The continuous portion 56c swings in accordance with rotation of the fulcrum portion 56a. The pressing portion 56d is provided at a tip end of the continuous portion 56c. The pressing portion 56d includes a surface that contacts an outer surface of the bearing holding member 7. When the continuous portion 56c swings, the pressing portion 56d moves downward, presses the bearing holding member 7, and presses down the bearing 4 and the first end 2c of the steering roller 2.

The link mechanism 53 may include a connection tool 59. For example, the connection tool 59 may be connected to the frames 23. The connection tool 59 may include an accommodation portion 59a that accommodates the bearing holding member 7. The connection tool 59 may include a surface that guides movement of the bearing holding member 7 in the Z direction. The connection tool 59 can hold a spring member 60 that is disposed in the Z direction, and supports the bearing holding member 7 from a downward side. A lower end of the spring member 60 is supported by the connection tool 59. An upper end of the spring member 60 can come into contact with a bottom surface of the bearing holding member 7. The spring member 60 is stretchable in the X direction, and can bias the bearing holding member 7 to an upward side.

An operation of the example belt driving device 20 will be described. The first belt roller 21 transmits power to the endless belt 11, to drive the endless belt 11 to move along a belt path. The second belt roller 22 rotates in accordance with movement of the endless belt 11. The steering roller 2 rotates in accordance with movement of the endless belt 11.

When the endless belt 11 deviates to an outer side in a width direction, an end surface of the endless belt 11 comes into contact with the flange portion 52c of the wheel 52. When the amount of movement of the endless belt 11 in the width direction increases, the endless belt 11 presses against the wheel 52. When the wheel 52 moves outward in the X direction, the wheel 52 pushes the first intermediate member 54 outwardly in the X direction, which in turn lifts up the pin member 55 by the inclined surface 54c. When the pin member 55 is displaced upward, the receiving portion 56*b* of the second intermediate member 56 is also lifted, and the second intermediate member 56 swings around the axial line L58.

Accordingly, the pressing portion 56*d* is displaced downward, and presses down the bearing holding member 7. With reference to FIG. 3, the first end 2*c* of the steering roller 2 moves downward, and the steering roller 2 is inclined.

When the steering roller 2 is inclined, the tension of the endless belt 11 on the first end 2*c* side becomes weaker than the tension of the endless belt 11 on the second end 2*d* side. Accordingly, the endless belt 11 moves to the second end 2*d* side in the width direction. As a result, positional deviation of the endless belt 11 is corrected.

When the endless belt 11 moves to the second end 2*d* side, a force of pushing out the wheel 52 in the X direction becomes weaker. Accordingly, the spring member 60 biases and pushes up the bearing holding member 7. Accordingly, the first end 2*c* moves upward, and the pressing portion 56*d* of the second intermediate member 56 moves upward. Due to the movement, the receiving portion 56*b* moves downward, and thus it is possible to press down the pin member 55. When the pin member 55, which contacts (or engages with) the inclined surface 54*c*, moves downward, the first intermediate member 54 moves inward in the X direction. The wheel 52 is pressed back by the first intermediate member 54, and returns to an original position as illustrated in FIG. 10. The first end 2*c* of the steering roller 2 returns to an original position as illustrated in FIG. 1.

In the belt driving device 20, it is possible to use the endless belt 11 in which a rib is not provided in an end in a width direction. In the belt driving device 20, positional deviation of the endless belt 11 in the width direction is corrected, and thus it is possible to suppress occurrence of meandering of the endless belt 11. In the belt driving device 20, it is possible to suppress occurrence of deformation of the endless belt 11 due to a deviation in a stretching force of the endless belt 11. Since the deformation of the endless belt 11 is suppressed, it is possible to prevent deformation such as waving.

The belt driving device 20 may have a configuration including an adjustment member (pressing member) that moves in a longitudinal direction of the steering roller 2 in accordance with movement of the endless belt 11 in the longitudinal direction of the steering roller 2, and a link mechanism that can incline the steering roller 2 in accordance with movement of the adjustment member. The belt driving device 20 may be arranged to receive a pressure of an end of the endless belt 11 due to the adjustment member disposed at the end of the steering roller 2, and to displace the end of the steering roller 2, thereby inclining the steering roller 2.

For example, the belt driving device 20 can be used as a transfer unit in an image forming apparatus such as a printer. The transfer unit can secondarily transfer a toner image that is developed by a developing unit onto a sheet. The endless belt 11 can be used as an intermediate transfer belt in the transfer unit. The belt driving device 20 can be used as a sheet conveying unit that conveys a sheet. The endless belt 11 can be used as a sheet conveying belt in the sheet conveying unit.

Figure 12:
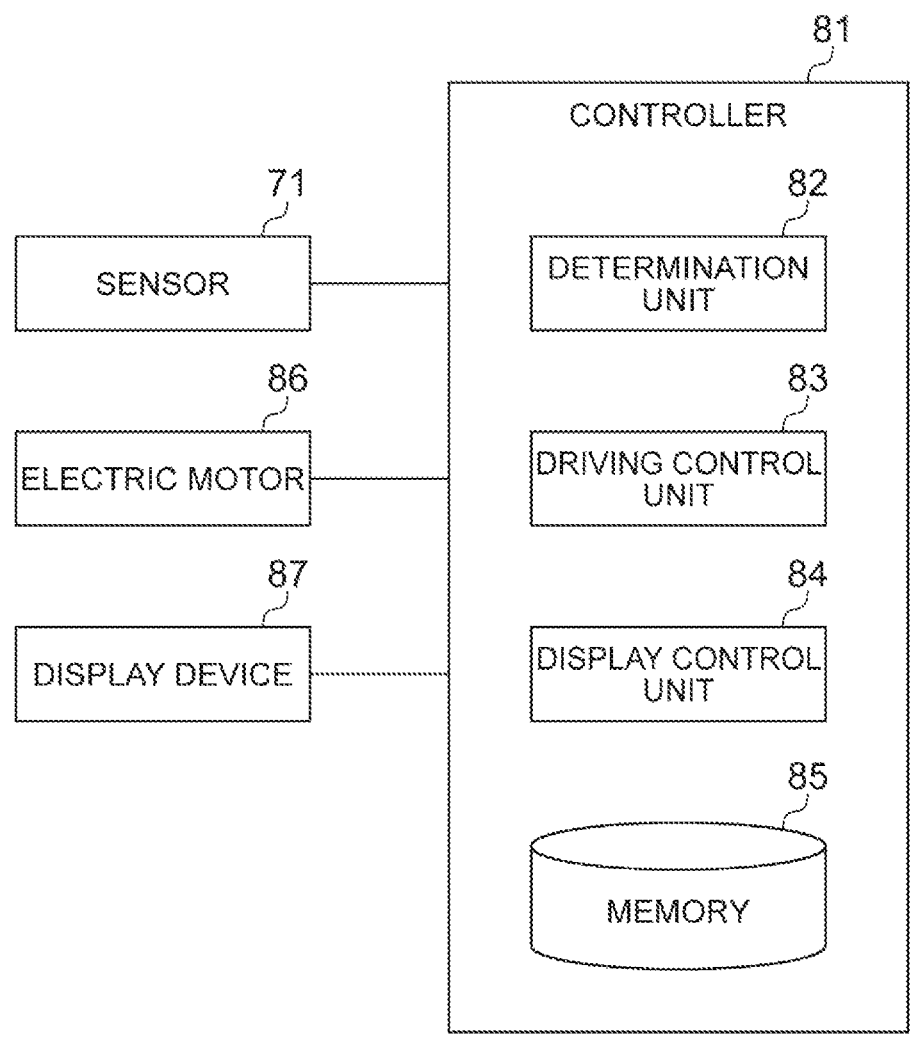
FIG. 12 is a block diagram illustrating components of an imaging system including a controller of a belt abnormality detection device.

FIG. 12 is a block diagram illustrating the belt abnormality detection device. The belt abnormality detection device 1 may include a controller 81, including a determination unit 82, a driving control unit 83, a display control unit 84, and a memory 85. The controller 81 may be provided by a computer that includes hardware such as a central processing unit (CPU), a read only memory (ROM), and a random access memory (RAM), and data and/or instructions such as a program stored in the ROM. The sensor 71, an electric motor 86, and a display device 87 are electrically connected to the controller 81. The electric motor 86 is a driving unit that rotates the first belt roller 21.

The determination unit 82 can receive a detection signal from the sensor 71. With regard to the detection signal, for example, when the steering roller 2 and the sensor 71 come into contact with each other, the sensor 71 transmits the detection signal. The determination unit 82 can detect the amount of displacement of the steering roller 2 due to the inclination on the basis of the detection signal. The determination unit 82 may determine whether or not to stop rotation of the first belt roller 21 on the basis of the amount of displacement of the steering roller 2 due to the inclination. In a case of receiving the detection signal, the determination unit 82 may determine that rotation of the first belt roller 21 should be stopped.

When the number of times of contact per unit time exceeds a determination threshold value, the determination unit 82 may determine that rotation of the first belt roller 21 should be stopped. The number of times of contact is the number of times of contact of the contact-type sensor with the steering roller 2. The determination unit 82 can calculate the number of times of contact on the basis of the detection signal. When a time for which the contact continues to exceed the determination threshold value, the determination unit 82 may determine that rotation of the first belt roller 21 should be stopped. The time for which the contact continues is a time for which the contact-type sensor and the steering roller 2 continuously come into contact with each other. The determination unit 82 can calculate a time for which the contact continues on the basis of the detection signal. For example, the memory 85 may store information the determination threshold value.

The driving control unit 83 can control driving of the electric motor 86. For example, the driving control unit 83 can control rotation and stoppage of the electric motor 86 by transmitting a driving signal. For example, when the determination unit 82 determines that rotation of the first belt roller 21 should be stopped, the driving control unit 83 can perform control of stopping the electric motor 86. For example, when the determination unit 82 determines that the amount of displacement exceeds the determination threshold value, the driving control unit 83 can generate a command signal, which may include a signal of stopping the driving of the electric motor 86.

The display control unit 84 can generate image information that is displayed on the display device 87. For example, when the determination unit 82 determines that the amount of displacement exceeds the determination threshold value, the display control unit 84 can generate a command signal. The display control unit 84 may generate a signal for displaying that the amount of displacement of the steering roller 2 exceeds the determination threshold value as a command signal. For example, the display device 87 may be a liquid crystal display device.

The image generation system may include, for example, a voice output unit. When the amount of displacement of the steering roller 2 exceeds a reference value, the controller 81 may allow the voice output unit to output an alarm.

The controller 81 may be electrically connected to a distance sensor that is the sensor 72. As illustrated in FIG. 3, the determination unit 82 may determine that the amount of displacement of the steering roller 2 due to the inclination exceeds the determination threshold value on the basis of the distance F. The controller 81 may calculate the distance F on the basis of a signal output from the sensor 72.

The controller 81 may be electrically connected to a light-shielding type sensor that is the sensor 73. The determination unit 82 may count the number of times of detection by the light-shielding type sensor, and may determine whether or not the number of times of detections per unit time exceeds the determination threshold value. The determination unit 82 may calculate a duration for which light is shielded, and may determine whether or not the duration exceeds the determination threshold value.

The memory 85 may be a non-transitory computer-readable recording medium (or storage device) that stores one or more commands or instructions. The instructions can be executed by a processor. The processor can execute the instructions for detecting the amount of displacement of the steering roller 2 due to the inclination. The processor can execute the instructions for determining whether or not the amount of displacement of the steering roller 2 exceeds the reference value. When the amount of displacement of the steering roller 2 exceeds the reference value, the processor can execute instructions for generating a command signal. When the amount of displacement of the steering roller 2 exceeds the reference value, the processor can execute instructions for generating a command signal that stops rotation of the first belt roller 21. When the amount of displacement of the steering roller 2 exceeds the reference value, the processor can execute instructions for generating a command signal for notification of a situation in which the amount of displacement exceeds the reference value.

Figure 13:
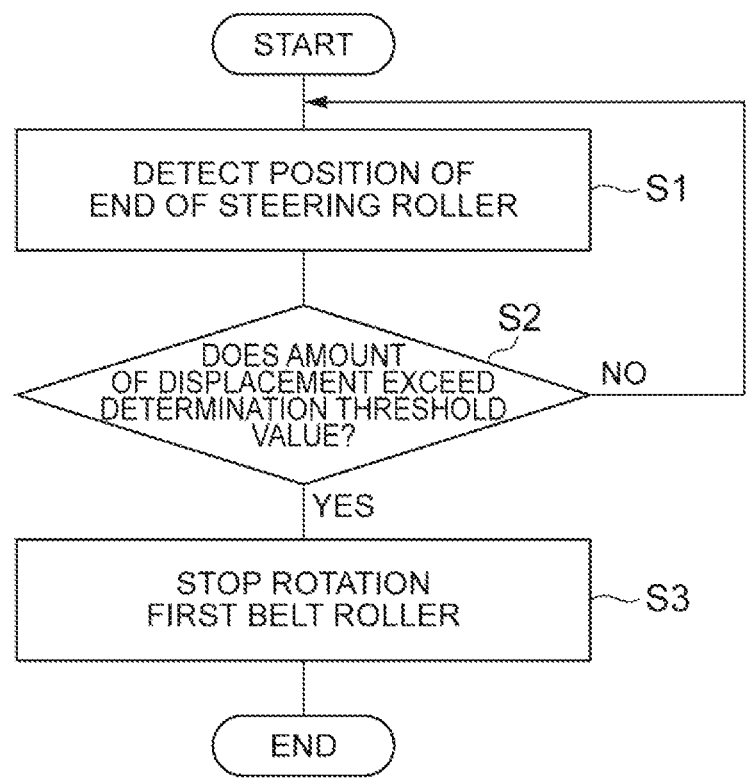
FIG. 13 is a flowchart illustrating an example procedure carried out by the controller.

FIG. 13 is a flowchart illustrating an example of a procedure carried out by the controller 81. In the belt abnormality detection device 1, a position of the end 2*c* or 2*d* of the steering roller 2 is detected by the sensor 71. The controller 81 detects the amount of displacement of the end 2*c* or 2*d* due to the inclination of the steering roller 2 on the basis of a signal output from the sensor 71 (S1). For example, as illustrated in FIG. 2, when the end 2*c* reaches a position indicated by the virtual line E1, the reaching of the position is detected by the sensor 71. The controller 81 can detect that the end 2*c* is displaced to the position indicated by the virtual line E1 on the basis of a signal transmitted from the sensor 71.

The determination unit 82 of the controller 81 determines whether or not the amount of displacement of the end 2*c* or 2*d* exceeds the determination threshold value (S2). For example, when the number of times of contact exceeds the determination threshold value, the determination unit 82 may determine that the amount of displacement of the end 2*c* or 2*d* exceeds the determination threshold value. When a contact time exceeds the determination threshold value, the determination unit 82 may determine that the amount of displacement of the end 2*c* or 2*d* exceeds the determination threshold value. When it is determined that the amount of displacement of the end 2*c* or 2*d* exceeds the determination threshold value, it proceeds to S3 (S2; YES). When it is determined that the amount of displacement of the end 2*c* or 2*d* does not exceed the determination threshold value, it returns to S1 (S2; NO).

At S3, the driving control unit 83 controls the electric motor 86 to stop rotation of the first belt roller 21. Accordingly, travel of the endless belt 11 is stopped. In the belt abnormality detection device 1, it is possible to suppress breakage of the endless belt 11 by detecting an inclination abnormality of the steering roller 2.

At S3, the controller 81 may output a command signal to the display device 87 to display a situation in which the amount of displacement of the steering roller 2 due to the inclination exceeds the determination threshold value.

In the belt abnormality detection device 1, it is possible to detect the amount of displacement of the steering roller 2 due to the inclination, and thus it is possible to detect an abnormality of the endless belt 11. In the belt abnormality detection device 1, it is possible to stop rotation of the first belt roller 21 before the endless belt 11 is broken. Accordingly, it is possible to reduce a concern of breakage of the endless belt 11. In the belt abnormality detection device 1, it is possible to notify a user of a situation in which the amount of displacement of the steering roller 2 due to the inclination exceeds the determination threshold value with the display device 87. Accordingly, the user can be notified of the abnormality of the endless belt 11, and thus the user can perform improvement or take corrective measures.

In the belt abnormality detection device 1, when the amount of displacement of the steering roller 2 due to the inclination exceeds the determination threshold value, the position of the fulcrum A of the steering roller 2 may be changed. For example, in the longitudinal direction L2 of the steering roller 2, the position of the fulcrum A may be changed by changing the position of the pivot shaft 9. For example, an elongated hole that guides movement of the pivot shaft 9 may be formed in the side plates 6*b* of the steering roller holding member main body. The pivot shaft 9 may be supported by the pivot shaft holding member 10. The pivot shaft 9 may be moved by moving the connection member 12 that supports the pivot shaft holding member 10 in the X direction. Accordingly, the pivot shaft 9 moves in the elongated hole, and the position of the fulcrum A is changed. A distance from the fulcrum A to the end 2*c* or 2*d* of the steering roller 2 can be changed. It is possible to increase the amount of correction (the amount of movement) in the X direction of the endless belt 11 by increasing a difference between tension of the endless belt at the end 2*c* and tension of the endless belt at the end 2*d*.

Figure 14:
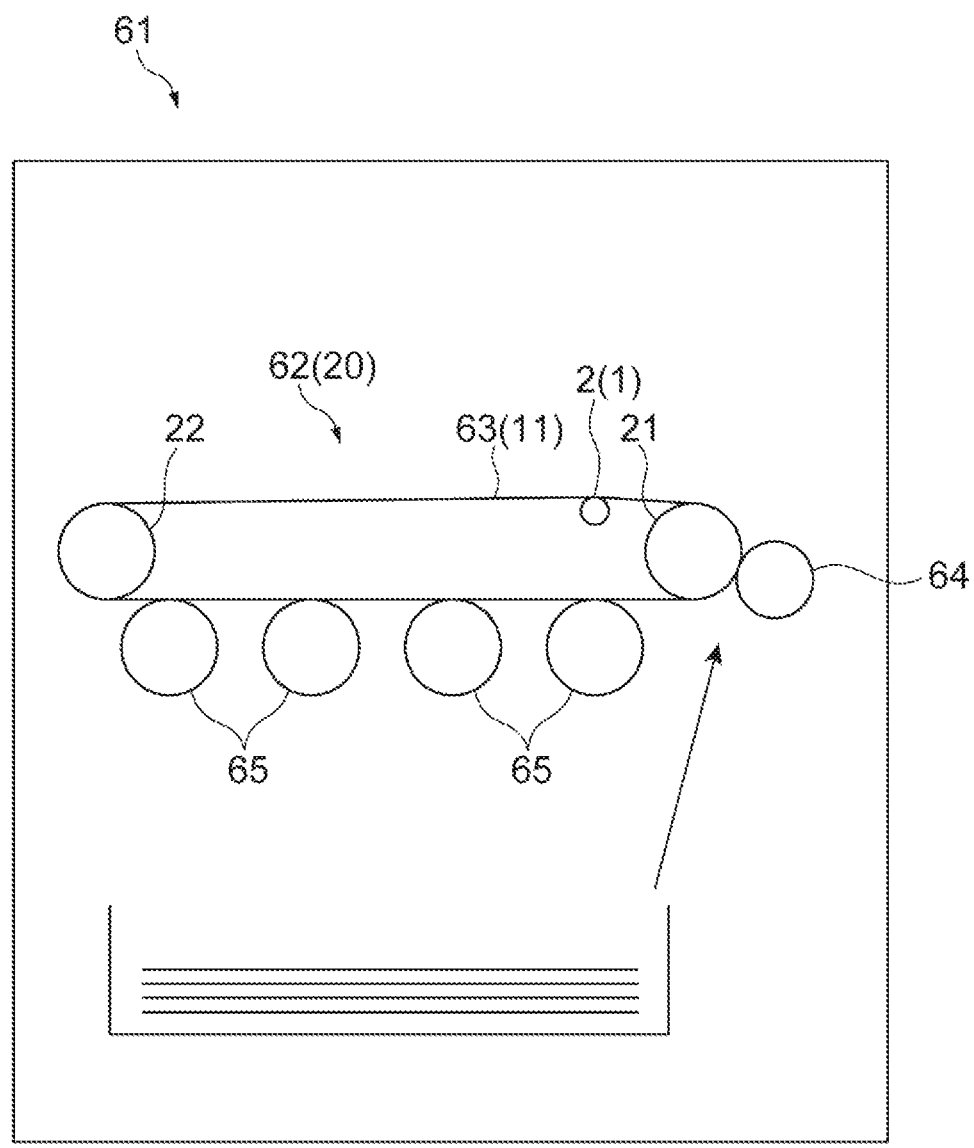
FIG. 14 is a schematic diagram illustrating an example color image forming apparatus including an intermediate transfer unit.

A color image forming apparatus including the intermediate transfer unit (transfer belt system) will be described. As illustrated in FIG. 14, the color image forming apparatus 61 includes the belt driving device 20 as an intermediate transfer unit 62. An intermediate transfer unit 62 includes the first belt roller 21 which is a driving roller, the second belt roller 22 that is a stretching roller, an intermediate transfer belt 63 that is the endless belt 11, and a secondary transfer roller 64. The intermediate transfer unit 62 may include a plurality of idle rollers which are disposed between the first belt roller 21 and the second belt roller 22. The secondary transfer roller 64 is disposed to press a sheet that is a recording medium against the intermediate transfer belt 63 that moves along the first belt roller 21. The color image forming apparatus 61 includes a photoreceptor 65, and various configurations that may be necessary for an image forming apparatus. A plurality of the photoreceptors 65 are disposed along a movement direction of the intermediate transfer belt 63.

A toner image formed on each of the photoreceptors 65 is primarily transferred to the intermediate transfer belt 63. The primarily transferred toner image is secondarily transferred to the sheet that is pressed by the secondary transfer roller 64. The toner image that is secondarily transferred to the sheet is fixed by a fixing device (not illustrated). In addition, the intermediate transfer unit 62 may include a cleaning blade (not illustrated) that removes a residual toner that adheres to the intermediate transfer belt 63. The cleaning blade is pressed to the intermediate transfer belt 63 to remove the residual toner.

Even in the color image forming apparatus 61, the belt driving device is provided, and thus it is possible to prevent a positional deviation in a width direction of the intermediate transfer belt 63. In the intermediate transfer unit 62, occurrence of a deformation such as waving of the intermediate transfer belt 63 is prevented. Accordingly, it is possible to prevent a deterioration of close-contact between the cleaning blade and the intermediate transfer belt 63, and thus it is possible to appropriately remove the residual toner. As a result, it is possible to improve image quality.

It is to be understood that not all aspects, advantages and features described herein may necessarily be achieved by, or included in, any one particular example. Indeed, having described and illustrated various examples herein, it should be apparent that other examples may be modified in arrangement and detail.

For example, in some of the above-described examples, the sensor detects the position of the end 2c or 2d of the steering roller 2 in the longitudinal direction L2, but other positions may be detected in other examples. The controller 81 may calculate the position of the end 2c or 2d of the steering roller 2 on the basis of information detected by the sensor.

The invention claimed is:

1. An imaging system comprising:
   a steering roller located between a first belt roller and a second belt roller, the steering roller being inclinable around a fulcrum;
   a sensor to detect an amount of displacement of the steering roller due to an inclination of the steering roller; and
   a controller to output a command signal to stop a rotation of the first belt roller when the amount of displacement of the steering roller exceeds a reference value.

2. The imaging system according to claim 1,
   wherein the command signal to be output by the controller comprises a command to stop the rotation of the first belt roller.

3. The imaging system according to claim 1,
   wherein the sensor detects a position of an end of the steering roller as the amount of displacement of the steering roller.

4. The imaging system according to claim 1,
   wherein the sensor is a contact-type sensor to detect the amount of displacement by detecting a contact with an end of the steering roller.

5. The imaging system according to claim 4,
   the controller to count a number of times of contact of the contact-type sensor with the end of the steering roller, and the controller to determine that the amount of displacement exceeds the reference value when the number of times of contact per time unit exceeds a determination threshold value, wherein the command signal includes a command to stop a rotation of the first belt roller.

6. The imaging system according to claim 1,
   wherein the sensor is a distance sensor to detect the amount of displacement by measuring a distance between the distance sensor and an end of the steering roller.

7. The imaging system according to claim 1, further comprising:
   a light-shielding piece that is displaceable in conjunction with a position of an end of the steering roller,
   wherein the sensor is a light-shielding type sensor to detect the amount of displacement by detecting light-shielding by the light-shielding piece.

8. The imaging system according to claim 7,
   the controller to count the number of times of detection by the light-shielding type sensor, and the controller to determine when the number of times of detection per unit time exceeds the reference value, wherein the command signal includes a command to stop a rotation of the first belt roller.

9. The imaging system according to claim 1,
   wherein the command signal includes a command to output a notification that the amount of displacement of the steering roller exceeds the reference value.

10. The imaging system according to claim 1, further comprising:
    the first belt roller and the second belt roller around which an endless belt is wound;
    an adjustment member that moves in a longitudinal direction of the first belt roller in accordance with a shifting movement of the endless belt in the longitudinal direction of the first belt roller; and
    a link mechanism to incline the steering roller in response to a movement of the adjustment member.

11. A transfer belt system, comprising:
    a pair of belt rollers including a first belt roller and a second belt roller;
    an endless belt being wound about the first belt roller and the second belt roller;
    a steering roller located between the first belt roller and the second belt roller, the steering roller being inclinable about a fulcrum to displace an end of the steering roller; and
    a sensor to detect the amount of displacement of the end of the steering roller, the sensor being a contact-type sensor to detect the amount of displacement by detecting a contact with an end of the steering roller.

12. The transfer belt system according to claim 11, further comprising:
    a controller to output a command signal when the amount of displacement of the end of the steering roller exceeds a threshold value.

13. A non-transitory memory device having instructions stored thereon that, in response to execution by a processor, cause the processor to perform operations comprising:
    detect an amount of displacement of a steering roller for an endless belt, due to an inclination of the steering roller;
    determine that the amount of displacement of the steering roller exceeds a reference value; and
    generate a command signal to stop a rotation of a first belt roller when the amount of displacement of the steering roller exceeds the reference value.

14. The non-transitory memory device according to claim 13,
    wherein the command signal includes a command to stop the rotation of the first belt roller.

15. The non-transitory memory device according to claim 13,
    wherein the command signal includes a command for a notification that the amount of displacement of the steering roller exceeds the reference value.

* * * * *